UNITED STATES PATENT OFFICE.

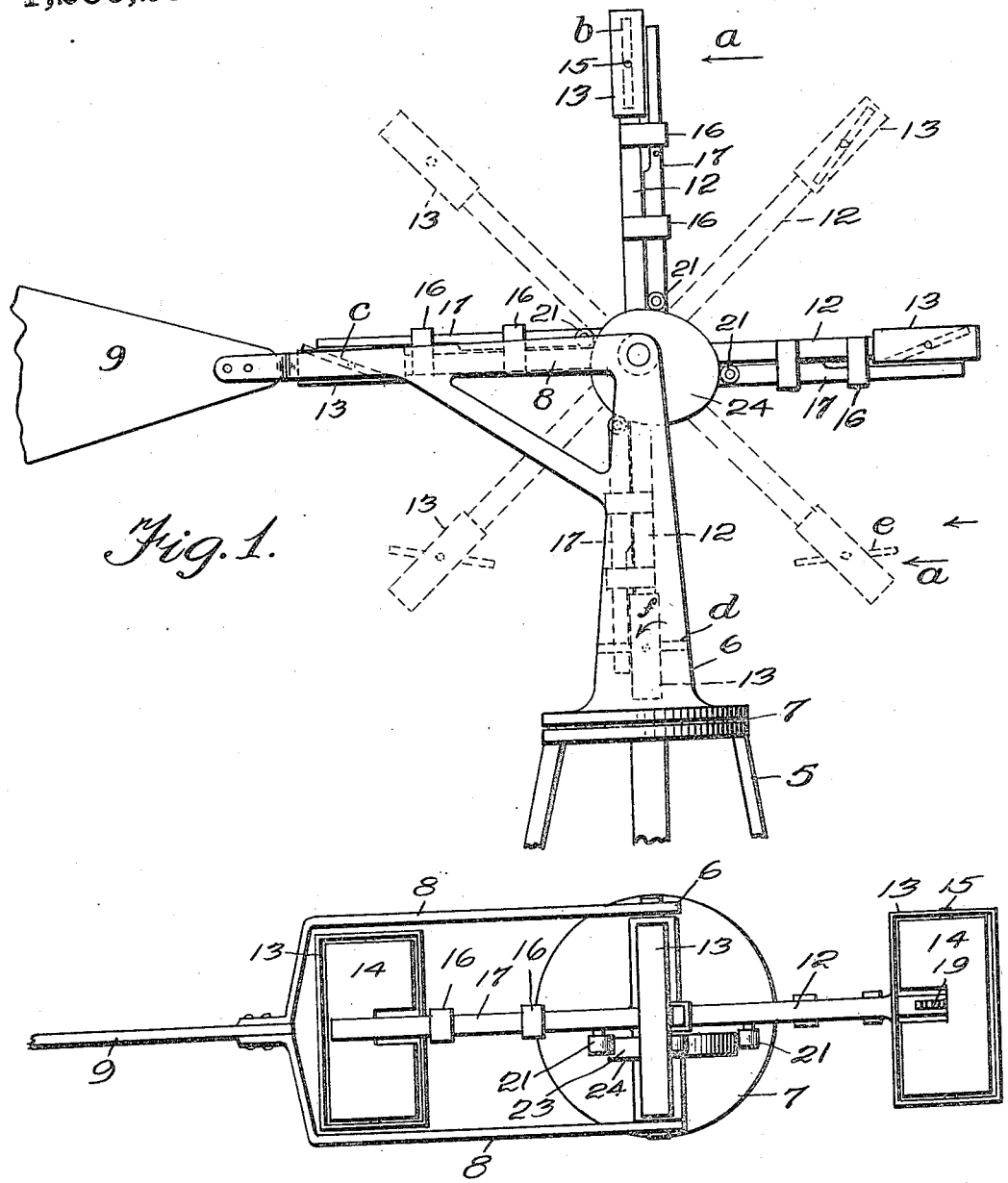

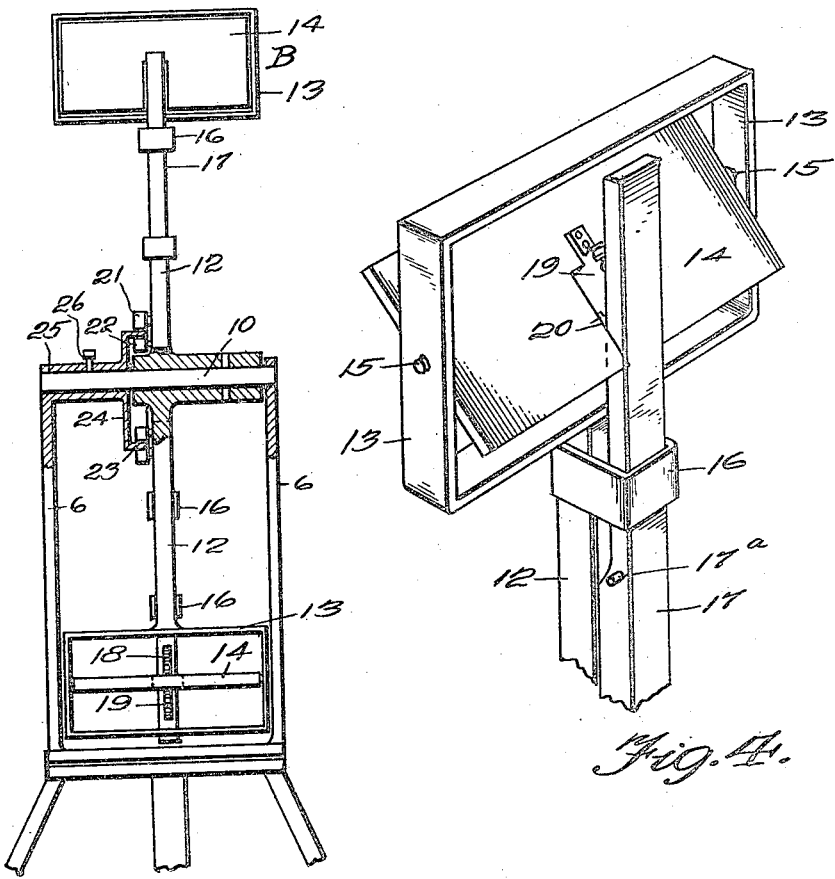
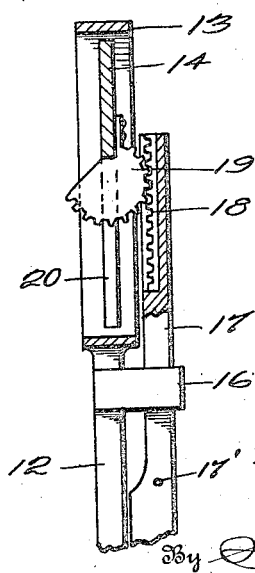

RANSLAWER E. BREWER, OF SAN DIEGO, CALIFORNIA.

WINDMILL.

1,260,254.  Specification of Letters Patent.  Patented Mar. 19, 1918.

Application filed June 25, 1917. Serial No. 176,812.

*To all whom it may concern:*

Be it known that I, RANSLAWER E. BREWER, a citizen of the United States of America, residing at San Diego, in the county of San Diego and State of California, have invented certain new and useful Improvements in Windmills, of which the following is a specification.

This invention relates to wind engines or windmills and its object is to provide an improved device of this character constructed in such manner as to utilize the force of the wind in the most effective way throughout the path of movement of the several blades of the wheel.

Further objects and advantages of the invention will be set forth in the detailed description which now follows:

In the accompanying drawings,

Figure 1 is a side elevation of a windmill constructed in accordance with the invention.

Fig. 2 is a plan view thereof.

Fig. 3 is a front view partly in section.

Fig. 4 is a perspective view of one of the blades and its mounting, and

Fig. 5 is a detail, sectional view through one of the blades and its mounting.

Like numerals designate corresponding parts in all of the figures of the drawings.

In the drawings 5 designates a supporting tower carrying a rotative head 6 which may be mounted upon the tower by ball-bearings 7, if desired. Rearwardly extending arms 8 carry a vane 9 by which the blades of the windmill are held facing the direction from which the wind is blowing. The head 6 carries a transverse shaft 10 upon which the hub of the windmill is mounted for rotation. This hub carries a plurality of radial arms 12 provided at their outer ends with yokes 13 and in these yokes blades 14 are trunnioned at 15.

Keeper straps 16 carried by the arms 12 hold plunger rods 17 in slidable relation to the arms 12. These plunger rods carry racks 18 which mesh with segmental gears 19 secured in cutout portions 20 of the blades 14. The inner ends of the plunger rods 17 are provided with pairs of laterally extending rollers 21 and 22 which lie upon opposite sides of a laterally extending cam flange 23 that is supported from a web 24 and provided with a hub 25 that may be made fast upon the shaft 10 by means of a set screw 26.

Accurate adjustment of the cam and consequent variation in the throw of the blades may be secured by moving the cam around the shaft 10, it being understood that the shaft 10 is a fixed shaft and that the hub 11 turns thereon. The shape of the cam is such that as the hub 11 and the radial arms 12 rotate the plunger rods 17 are caused to move inwardly and outwardly to thereby throw the blades 14 to that position where they will be most effectively acted upon by the wind. Assuming that the direction of the wind is as indicated by the arrow *a* the blades will, when at the top, lie in a vertical position and be exposed to the full force of the wind as indicated at *b*. As the blades move around to the left they gradually assume the position indicated at *c*, where they are still acted upon by the wind impinging upon their inclined upper faces, to continue the downward movement of the radial arms by which that particular blade is carried. When the blade reaches the bottom of its travel it lies in a substantially horizontal plane as indicated at *d* where it offers no resistance to the wind. The cam is preferably shaped to move the blade slightly farther than the position illustrated at *d* so that as the blade moves from the position indicated at *d* to the position indicated at *e* it presents a slightly inclined underface to the action of the wind to aid in lifting the arm by which it is carried. After the blade passes from the horizontal center of its upward travel it is quickly thrown by the cam to its original position; namely, that indicated at *b*.

While I have described the use of a cam for moving the blades, I may, if desired, dispense with this cam and make the plunger rods of such weight that they will act to shift the blades in one direction and the force of the wind may be utilized to shift the blades in the opposite direction. This is accomplished by using the weight of the plunger rods to move the blades to the position illustrated at *d* but in this case the throw of the plunger rods is made such as to prevent the blade from moving beyond the position illustrated at *d*. This may be accomplished by a stop pin such as is indicated at 17ª in Fig. 4. Where the cam is dispensed with and the blade is moved to the position illustrated at *d* by the weight of the associated plunger rod the blade in moving to the position illustrated at *d* turns in the direction of the arrow *f* and the blade stays in the position illustrated at $d$ until the radial arms by which the blade is carried reaches the horizontal center upon its upward movement, after which the movement of the plunger rods shifts the blades to the position shown at $b$ during the travel of the blades through the upper right-hand quarter of their revolutions.

Having described my invention what I claim is:—

1. A device of the character described, comprising a rotative element carrying a plurality of radial arms, a yoke carried by each of said arms, a blade trunnioned horizontally in each of said yokes, a plunger rod bodily movable with respect to each of the radial arms, racks carried by the plunger rods and segmental gears carried by the blades which mesh with the racks, the lower edges of the blades being cut out to permit them to rock past the plunger rods.

2. A device of the character described comprising a support, a hub mounted to rotate thereon, a shaft carried by said support, a cam mounted upon said shaft and movable therearound, means for binding said cam in varying positions about said shaft, a bodily rotative member carrying a plurality of radial arms, rectangular yokes upon the outer ends of said arms, blades horizontally trunnioned in said yokes, plunger rods slidably mounted with respect to said arms, segmental gears mounted in cut out portions of the blades and racks carried by the plunger rods and meshing with said gears.

In testimony whereof I affix my signature.

RANSLAWER E. BREWER.

Copies of this patent may be obtained for five cents each, by addressing the "Commissioner of Patents, Washington, D. C."